(12) United States Patent
Williams et al.

(10) Patent No.: US 6,293,604 B1
(45) Date of Patent: Sep. 25, 2001

(54) ADJUSTABLE REAR SEAT BACK SUPPORT

(75) Inventors: Bruce Preston Williams, Grosse Point Park; Michael Gousotti Ellis, Plymouth, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/709,618

(22) Filed: Nov. 10, 2000

Related U.S. Application Data

(60) Provisional application No. 60/175,325, filed on Jan. 10, 2000.

(51) Int. Cl.[7] ............................................... B60N 2/02
(52) U.S. Cl. ................................ 296/65.16; 296/65.01; 297/328; 297/341
(58) Field of Search ........................... 296/65.16, 65.01; 297/328, 341, 349.1, 484

(56) References Cited

U.S. PATENT DOCUMENTS

| | | |
|---|---|---|
| 2,318,125 | 5/1943 | Snyder . |
| 2,582,687 | 1/1952 | Fisher . |
| 2,848,273 | 8/1958 | Diaz . |
| 3,947,069 * | 3/1976 | Lusch .................................. 297/341 |
| 4,168,050 * | 9/1979 | Nerem et al. ........................ 297/328 |
| 4,732,424 * | 3/1988 | Uredat-Neuhoff ................... 297/341 |
| 4,750,222 * | 6/1988 | Quakenbush ............................. 5/37 |
| 4,768,829 * | 9/1988 | Goldman ............................. 297/349 |
| 4,770,463 * | 9/1988 | Nishino ............................... 297/367 |
| 4,955,973 * | 9/1990 | Provencher ......................... 297/335 |
| 5,036,938 * | 8/1991 | Blount et al. ....................... 180/208 |
| 5,294,182 * | 3/1994 | Colasanti ............................ 297/484 |
| 5,338,100 * | 8/1994 | Rees ................................. 297/452.1 |
| 5,570,931 | 11/1996 | Kargilis et al. . |
| 5,826,940 * | 10/1998 | Hodgdon .......................... 297/303.1 |
| 5,975,612 | 11/1999 | Macey et al. . |
| 6,000,751 * | 12/1999 | Kato et al. ........................ 296/65.16 |

* cited by examiner

*Primary Examiner*—Joseph D. Pape
*Assistant Examiner*—Kiran B. Patel
(74) *Attorney, Agent, or Firm*—Damian Porcari; William J. Coughlin

(57) ABSTRACT

An adjustable seat back and supporting rear rail for a specialty vehicle is disclosed. The rear rail is secured by a latches to a pair of pillars of the vehicle within a range of vertical locations. The seat back is selectively lockable within a range of angular orientations from horizontal to vertical. The seat back includes pivot pins that are held by locking fasteners in the desired angular orientation on the rear rail.

5 Claims, 3 Drawing Sheets

ADJUSTABLE REAR SEAT BACK SUPPORT

CROSS-REFERENCE TO RELATED APPLICATION

This application claims the benefit of U.S. provisional application Ser. No. 60/175,325, filed Jan. 10, 2000.

TECHNICAL FIELD

The present invention relates to adjustable supports for a vehicle seat back.

BACKGROUND ART

Seats for vehicles generally have a fixed seat back that is held in a fixed angular orientation relative to the seat base. Alternatively, a tilt adjustment may be provided for a seat back where a lever is actuated to permit the angular orientation of the seat back relative to the seat base to be adjusted. Frequently, tilting seat backs are provided for the front seats of a vehicle and the rear seats are normally of the fixed angular orientation variety. Seats provided in the rear portion of the passenger compartment of a sport utility vehicle or van may be pivotable to facilitate ingress and egress and may also be provided with a tilt mechanism. Seats that are not provided with a tilt mechanism may be less comfortable than those that offer tilt adjustability. Tilt mechanisms tend to be relatively complicated with spring latches and pawls providing selective locking functionality.

Specialized vehicles including electric vehicles, golf carts, and other utility vehicles are currently being developed. To improve performance of these types of vehicles and the range of electric vehicles, it is important that the weight of the vehicle and its components be minimized. Specialized vehicles generally provide seats for one or more people and open or closed cargo storage areas. Normally, a predetermined number of seating areas and cargo storage areas are provided by the vehicle and it is not possible to convert seating areas to cargo areas without extensive modification of the vehicle. For example, golf carts are provided with two seats and storage space for two golf bags at the rear of the vehicle and a basket for storage of other items. It is not possible to convert such speciality vehicles to provide seating for four persons if the golf cart is designed for two riders. Other specialized vehicles such as electric airport courtesy vehicles may provide seating for four to eight persons but it is not easy to eliminate seating and provide cargo areas.

These and other problems are addressed by applicant's invention as summarized below.

DISCLOSURE OF INVENTION

According to the present invention, an adjustable seat back for a seat that is provided for a vehicle having pillars on opposite lateral sides extending in a vertical direction. The pillars each have an elongated slot in a rear facing edge. A rear rail having a central portion extending generally across the vehicle and first and second forwardly extending end portions is provided. The end portions have slot latches that are received in the slot in the rear facing edge of the pillars. The seat back includes a rigid support portion and right and left pivot pins. The rear rail has right and left pivot pin receptacles for receiving the right and left pivot pins of the seat back. The slot latches are secured to the slots in a range of vertically spaced locations to permit the seat back to be oriented in a range of positions between the substantially vertical position and a substantially horizontal position.

According to another aspect of the present invention, the rigid support of the seat back may be a planar frame having a pad one side thereof.

According to another feature of the invention the slot latches may be linearly moveable, spring biased pins disposed in a slot in the end portions of the rear rail. The moveable pins each have a manual actuator. The elongated slots each have a series of holes in vertically spaced locations in which the moveable pins may be received.

According to the invention, right and left pivot pins each may be provided with a locking mechanism for holding the pins in a selected angular orientation relative to the rear rail.

A further feature of the invention is to provide a seat back that extends across substantially the entire width of the vehicle to provide a seat back for a bench type seat or a wide platform for open storage.

These and other objects and advantages of the present invention will be better understood in view of the attached drawings and detailed description of the illustrated embodiment of the invention.

BEST MODE FOR CARRYING OUT THE INVENTION

Figure 1:
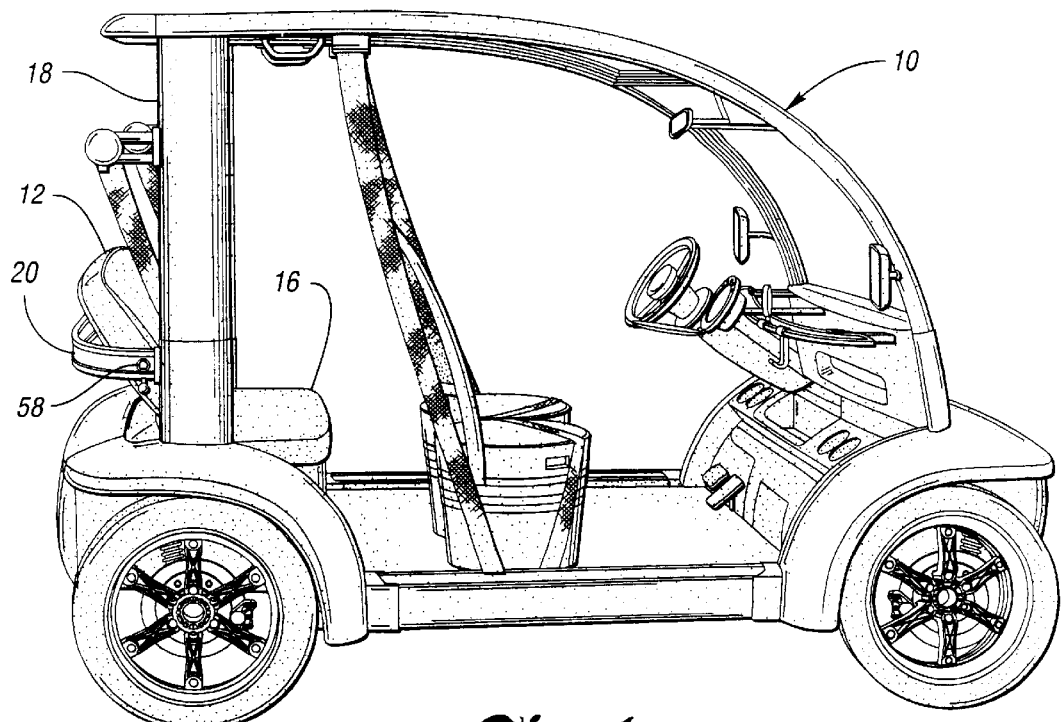
FIG. 1 is a side elevation view of an electric personal mobility vehicle having an adjustable seat back and seat back support combination in accordance with the present invention.

Referring now to FIG. 1, a specialty vehicle 10 featuring an adjustable seat back 12 for a rear seat 16 is shown. The vehicle 10 has a B pillar 18 extending in a vertical direction. A selectively positionable rear rail 20 is secured to the B pillar 18 in a range of vertically spaced locations.

Figure 2:
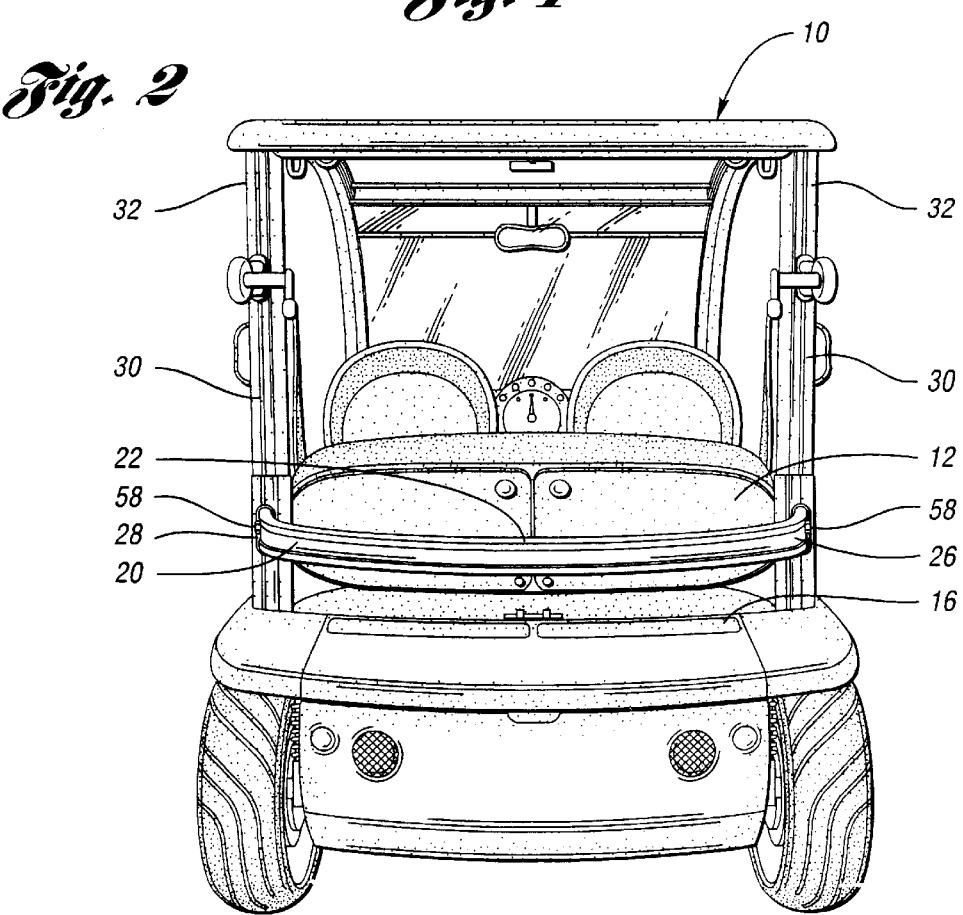
FIG. 2 is a rear elevation view thereof.
Figure 3:
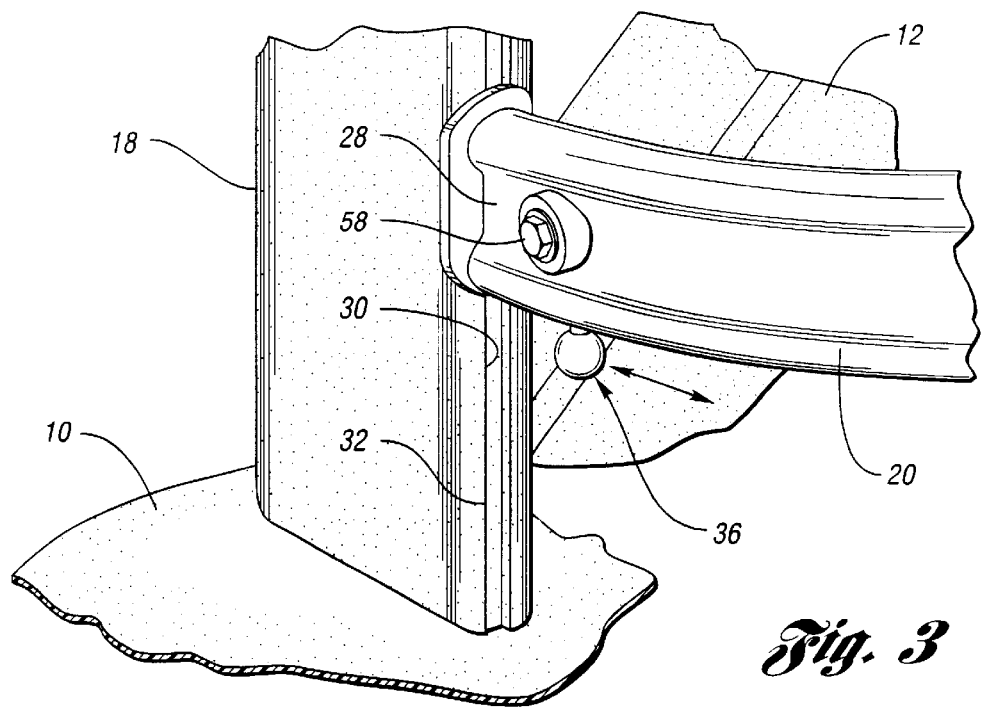
FIG. 3 is a fragmentary perspective view of a seat back and rear rail shown attached to a pillar on one side of a vehicle.
Figure 4:
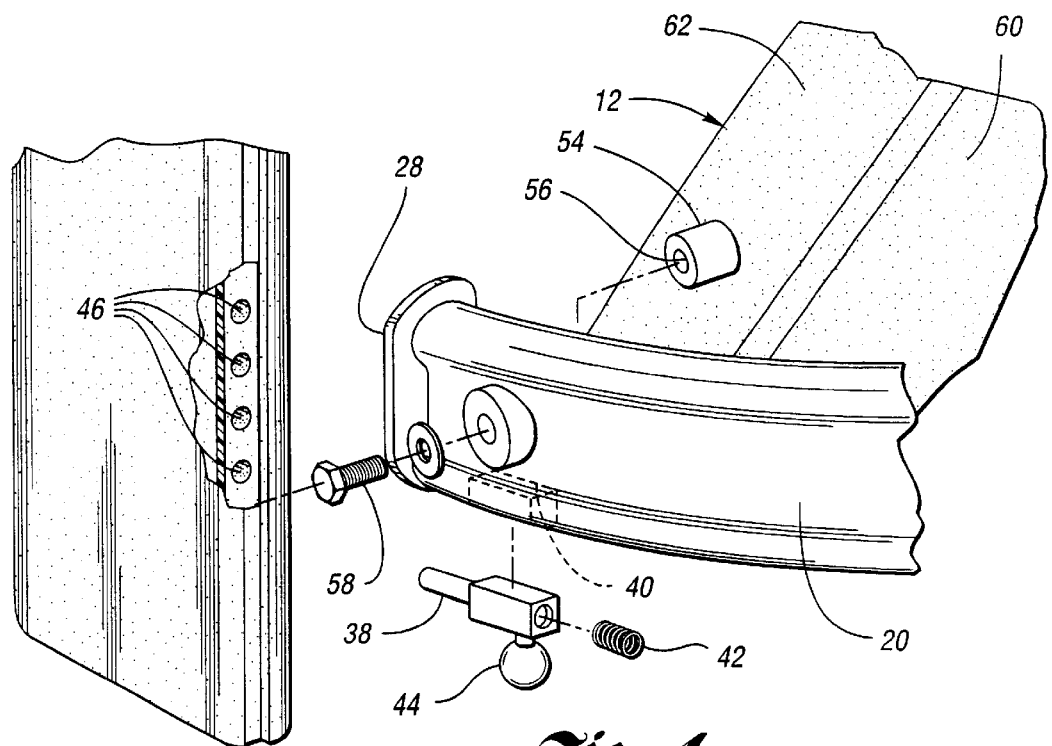
FIG. 4 is an exploded perspective view of the rear rail and pillar showing the seat back adjustment mechanism and manually actuated slot latches.

Referring now to FIGS. 2, 3, and 4, the rear rail 20 has a central portion 22 and first and second end portions 26, 28. A slot 30 is provided in a rear facing edge 32 of the B pillar 18.

Referring now to FIGS. 3 and 4, a slot latch 36 is generally indicated in FIG. 3. The slot latch 36, as shown in FIG. 4, includes a pin 38 that is received in a slot 40 formed in the end portion 28. The pin 38 is biased by a spring 42 outwardly from the end portion 28. An actuator 44, or knob, is affixed to the pin 38 to allow for manual actuation of the slot latch 36. When the rear rail 20 is assembled to the B pillar 18, the actuator 44 is released to allow the pin 38 to be received in a hole 46 within the slot 30.

The seat back 12 is secured to the rear rail 20 by means of a pivot pin 54 that includes a threaded hole 56 for receiving a locking fastener 58 that extends through the end portion 28 of the rear rail 20. The locking fastener 58 is tightened into the threaded hole 56 in the pivot pin 54 to hold the seat back 12 in an angular orientation relative to the rear rail 20 ranging between horizontal and vertical angular orientations.

Figure 5:
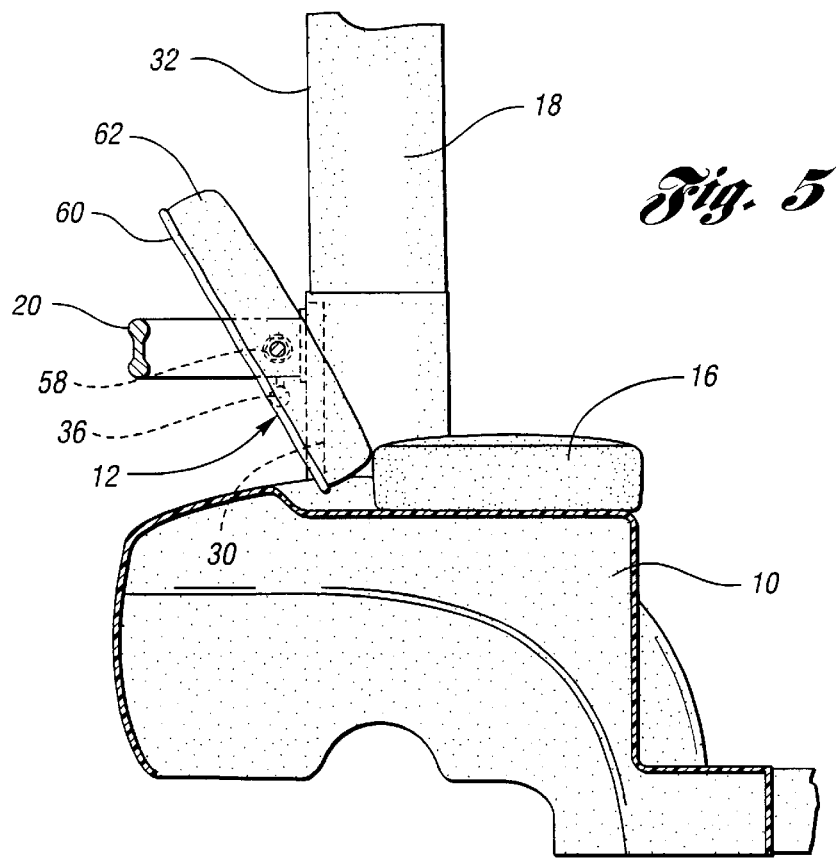
FIG. 5 is a cross-sectional view of the adjustable seat back and seat back support combination showing the seat back in a substantially vertical orientation.
Figure 6:
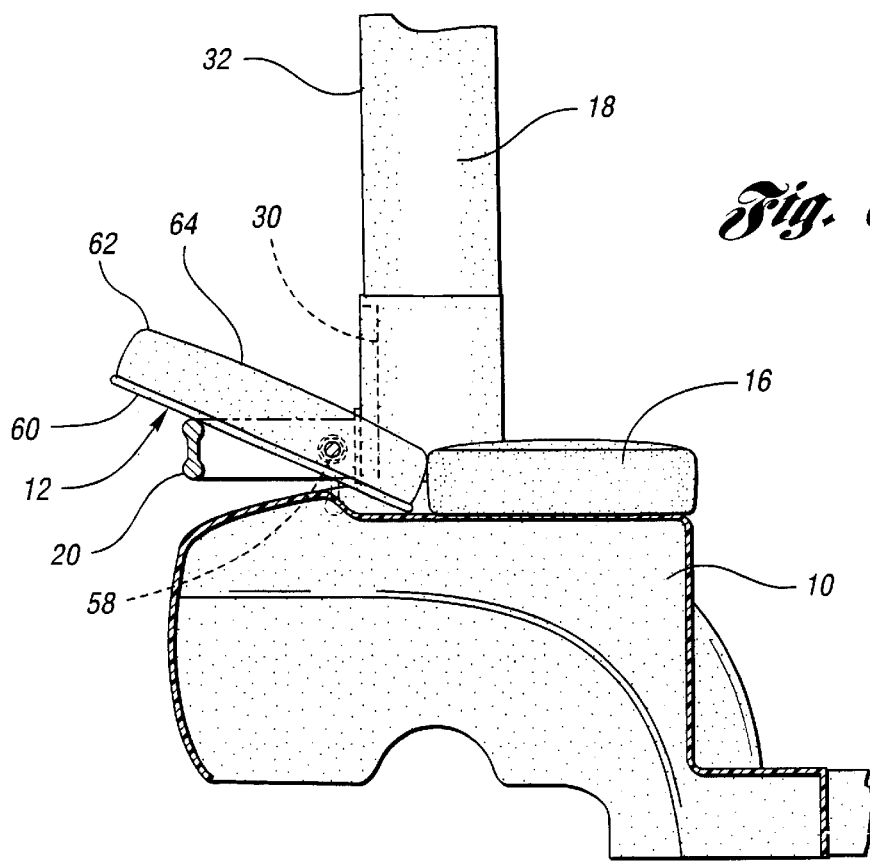
FIG. 6 is a cross-sectional view of the adjustable seat back and seat back support combination showing the seat back in a substantially horizontal orientation.

Referring now to FIGS. 5 and 6, the seat back 12 is shown in a substantially vertical orientation in FIG. 5 and is shown in a substantially horizontal orientation in FIG. 6. The angular orientation of the seat back 12 may be changed simply by moving the rear rail 20 up or down and adjusting the angle of the seat back 12 by pivoting the seat back on the pivot pin 54 and releasing and locking the locking fastener 58.

As used herein, the terms are substantially vertical and can be construed as including angular orientations between 45° and 90° relative to the B pillar 18. The term substantially horizontal, on the other hand, should be construed as angular orientations between 0° and 450°.

The seat back 12 includes a planar frame 60 to which a pad 62 is attached. The pad 62 functions as a storage platform 64 when the seat back 12 is in its substantially horizontal orientation.

While the best mode for carrying out the invention has been described in detail, those familiar with the art to which this invention relates will recognize various alternative designs and embodiments for practicing the invention as defined by the following claims.

What is claimed is:

1. In combination, an adjustable seat back and seat back support for a seat that is attached to a vehicle having a pair of pillars on opposite lateral sides of the vehicle extending in a vertical direction, the pillars each having an elongated slot in a rear facing edge, the combination comprising a rear rail having a central portion extending generally across the vehicle and having first and second end portions extending in a forward direction, the end portions having slot latches that are received in the slot in the rear facing edge of the pillar, a seat back having a rigid support portion, the seat back having a right and left pivot pin, the rear rail having right and left pivot pin receptacles in which right and left pivot pins are received, the slot latches being secured to the slots in a range of vertically spaced locations to permit the seat back to be oriented in a range of positions between a substantially vertical position and a substantially horizontal position.

2. The combination of claim 1 wherein said rigid support is a planar frame having a pad on one side thereof.

3. The combination of claim 1 wherein the slot latches are linearly moveable pins disposed in a slot in the end portions of the rear rail, the pins having a manual actuator and wherein the elongated slots have a series of holes at vertically spaced locations in which the pins are received.

4. The combination of claim 1 wherein the right and left pivot pins each have a locking mechanism for holding the pivot pins in a selected angular orientation relative to the rear rail.

5. The combination of claim 1 wherein the seat back extends across substantially the entire width of the vehicle to provide a seat back for a bench type seat when vertically oriented and providing a full width storage platform when horizontally oriented.

* * * * *